United States Patent
Miura et al.

(10) Patent No.: US 6,763,105 B1
(45) Date of Patent: Jul. 13, 2004

(54) TELEPHONE WITH CALL-INCOMING-OPERATION LIMITING FUNCTION AND METHOD OF LIMITING CALL-INCOMING OPERATION OF TELEPHONE

(75) Inventors: Nozomi Miura, Kanagawa (JP); Toshiyuki Toda, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/191,581

(22) Filed: Nov. 13, 1998

(30) Foreign Application Priority Data

Nov. 19, 1997 (JP) .............................................. 9-333753

(51) Int. Cl.⁷ .............................................. H04M 1/00
(52) U.S. Cl. .................................. 379/373.01; 379/372
(58) Field of Search .................... 379/88.08, 373.01, 379/376.02, 377, 372, 421; 455/561

(56) References Cited

U.S. PATENT DOCUMENTS

| | | | | |
|---|---|---|---|---|
| 4,405,839 A | * | 9/1983 | Groff ..................... | 379/376.02 |
| 4,480,154 A | * | 10/1984 | Klee ..................... | 379/376.02 |
| 4,625,081 A | * | 11/1986 | Lotito et al. ............. | 379/88.08 |
| 5,317,632 A | * | 5/1994 | Ellison ................... | 379/199 |
| 5,752,191 A | * | 5/1998 | Fuller et al. ............. | 455/445 |
| 5,812,648 A | * | 9/1998 | Wanner ................... | 379/421 |
| 5,966,655 A | * | 10/1999 | Hardouin ................. | 455/561 |
| 5,978,469 A | * | 11/1999 | Benson ................... | 379/377 |
| 6,317,593 B1 | * | 11/2001 | Vossler ................... | 455/414 |

FOREIGN PATENT DOCUMENTS

| | | | | |
|---|---|---|---|---|
| CN | | 2150684 Y | 12/1993 | |
| WO | WO 97/16932 | | * 5/1997 | ............ H04Q/7/18 |

* cited by examiner

*Primary Examiner*—Minsun Oh Harvey
*Assistant Examiner*—Jefferey Harold
(74) *Attorney, Agent, or Firm*—Pearne & Gordon LLP

(57) ABSTRACT

A telephone with a call-incoming-operation limiting function which has a clock means 2 for measuring the time and changes over call-incoming operation according to the time, comprises: a ringer-tone-volume controlling means 4 for controlling the tone volume of a ringer 5 during call incoming; and a call-incoming-operation limiting function controlling means 3 for instructing the ringer-tone-volume controlling means at the time set by a user to change over the tone volume of the ringer to a tone volume set by the user. By designating the time when the surroundings become quiet and by lowering the tone volume of the ringer, the user is able to know call incoming without imparting discomfort and annoyance to the surrounding people.

15 Claims, 8 Drawing Sheets

(2)-A, -B: AUTOMATIC CHANGEOVER BY SETTING THE TIME (4)-A, -B: AUTOMATIC CHANGEOVER BY SETTING THE TIME (6)-A, -B: AUTOMATIC CHANGEOVER BY SETTING THE TIME (8)-A, -B: AUTOMATIC CHANGEOVER BY SETTING THE TIME (10)-A, -B: AUTOMATIC CHANGEOVER BY SETTING THE TIME (12)-A, -B: AUTOMATIC CHANGEOVER BY SETTING THE TIME
AND SIGNALING OF CALL-INCOMING LIMITED TIME

TELEPHONE WITH CALL-INCOMING-OPERATION LIMITING FUNCTION AND METHOD OF LIMITING CALL-INCOMING OPERATION OF TELEPHONE

BACKGROUND OF THE INVENTION

The present invention relates to a telephone such as a fixed telephone, a portable telephone, and a PHS, and a method of limiting call-incoming operation of the telephone, and more particularly to a telephone which is able to automatically effect a changeover call-incoming operation corresponding to a time zone.

With conventional telephones, a user is able to select the tone volume of a ringer during call incoming and a singing melody, but the selected state is fixed unless the user changes it, and even in a night time zone from evening till morning when the surroundings become quiet and even in a daytime zone when the surroundings are noisy, call incoming is signaled with the same call-incoming tone volume or call-incoming pattern.

For this reason, in the case of a telephone in which the call-incoming tone volume is set to a high level or the call-incoming pattern is set to a quick one which sounds bustling, during the night, the high level of the call-incoming tone volume, the high tone of the call-incoming pattern, and the bustling quality of the call-incoming pattern impart discomfort and annoyance to the surrounding people. In a case where the call-incoming tone volume is set to a low level or the call-incoming pattern is set to a slow call-incoming pattern, the call-incoming tone during the daytime when the surroundings are noisy becomes difficult to hear.

To overcome such a problem, Japanese Utility Model Laid-Open 5-46154/(1993) discloses a telephone with a call-incoming-operation limiting function which is arranged such that, during a specific time zone in a day, the output to the ringer during call incoming is cut off, and call incoming is signaled by a call-incoming lamp alone.

However, with such a conventional telephone with a call-incoming-operation limiting function, there is a problem in that the user is unable to know call incoming if the user is not looking at the lamp.

In addition, there are also cases where the user is unaware of the fact that there has been a changeover in the signaling method, and an inconvenience occurs as a result.

In addition, there are cases where the answering phone function or the like is used every day during a fixed time zone, but in such cases it is very troublesome to set the answering phone function on each such occasion every day and to cancel it when it has become unnecessary. Furthermore, the user may often forget to set or cancel the answering phone function or the like.

SUMMARY OF THE INVENTION

The present invention overcomes the above-described conventional problems, and its object is to provide a telephone with a call-incoming-operation limiting function which limits the call-incoming operation in correspondence with a time zone by a method whereby the user is capable of noticing call incoming, and to provide a method of limiting call-incoming operation which is capable of overcoming the trouble with which the setting for limitation must be performed every day, and of overcoming the problem of forgetting to perform the setting or cancellation.

Accordingly, the telephone with a call-incoming-operation limiting function in the present invention is provided with: ringer-tone-volume controlling means for controlling a tone volume of a ringer during call incoming; and call-incoming-operation limiting function controlling means for instructing the ringer-tone-volume controlling means at the time set by a user to change over the tone volume to a tone volume set by the user.

In addition, the telephone with a call-incoming-operation limiting function in the present invention is provided with: call-incoming-pattern controlling means for controlling a ringing pattern of a ringer during call incoming; and call-incoming-operation limiting function controlling means for instructing the call-incoming-pattern controlling means at the time set by a user to change over the ringing pattern to a ringing pattern set by the user.

In addition, the telephone with a call-incoming-operation limiting function in the present invention is provided with: vibrator controlling means for controlling a vibrator for signaling call incoming; and call-incoming-operation limiting function controlling means for instructing the vibrator controlling means at the time set by a user to effect a changeover to signaling of call incoming by the vibrator.

Furthermore, the telephone with a call-incoming-operation limiting function in the present invention is provided with: answering-phone-function controlling means for controlling an answering phone function; and call-incoming-operation limiting function controlling means for instructing the answering-phone-function controlling means at the time set by a user to use the answering phone function during call incoming.

Furthermore, in the method of limiting call-incoming operation of a telephone, the tone volume of a ringer during call incoming is automatically changed over to a set tone volume each time a time zone set by a user periodically arrives. Alternatively, the ringing pattern of a ringer during call incoming is automatically changed over to a set ringing pattern each time a time zone set by a user periodically arrives, or the signaling method during call incoming is automatically changed over to a method of signaling by vibration each time a time zone set by a user periodically arrives. Still alternatively, the response during call incoming is automatically changed over to a response by an answering phone function each time a time zone set by a user periodically arrives.

For this reason, by setting a time zone when the surroundings become quiet and by limiting the call-incoming operation during that time zone, the user is capable of knowing call incoming without imparting discomfort and annoyance to the surrounding people. In addition, once the setting for limiting the call-incoming operation is performed, it is unnecessary to provide the setting or cancel it every day and it become possible to overcome the problem of forgetting to perform the setting or cancellation.

According to the first aspect of the present invention, there is provided a telephone with a call-incoming-operation limiting function which has clock means for measuring the time and changes over call-incoming operation according to the time, comprising: ringer-tone-volume controlling means for controlling a tone volume of a ringer during call incoming; and call-incoming-operation limiting function controlling means for instructing the ringer-tone-volume controlling means at the time set by a user to change over the tone volume to a tone volume set by the user. By providing a setting to lower the tone volume of the ringer after setting the time when the surroundings become quiet, the user is able to know call incoming without imparting discomfort and annoyance to the surrounding people.

According to the second aspect of the present invention, at a starting time of a time zone set by the user, the call-incoming-operation limiting function controlling means instructs the ringer-tone-volume controlling means to effect a changeover to the tone volume set by the user and, at an ending time of the time zone, instructs the ringer-tone-volume controlling means to stop the changeover. Once this time zone is set, the tone volume is automatically changed over each time that time zone arrives periodically. Hence, it is possible to dispense with the trouble with which the tone volume is repeatedly set on each arrival of the time zone, and it is possible to prevent forgetting to perform the setting or cancellation.

According to the third aspect of the present invention, there are provided call-incoming-pattern controlling means for controlling a ringing pattern of a ringer during call incoming; and call-incoming-operation limiting function controlling means for instructing the call-incoming-pattern controlling means at the time set by a user to change over the ringing pattern to a ringing pattern set by the user. By virtue of the change in the call-incoming pattern in which the tone is set to a lower level in the audible range (e.g., 200–400 Hz), or the ringing interval is set to be long (e.g., 4–5 sec), or the melody is changed over to a minor key, the user is able to know call incoming without imparting discomfort and annoyance to the surrounding people.

According to the fourth aspect of the present invention, at a starting time of a time zone set by the user, the call-incoming-operation limiting function controlling means instructs the call-incoming-pattern controlling means to effect a changeover to the ringing pattern set by the user and, at an ending time of the time zone, instructs the call-incoming-pattern controlling means to stop the changeover. Once this time zone is set, the ringing pattern is automatically changed over each time that time zone arrives periodically. Hence, it is possible to dispense with the trouble with which the ringing pattern is repeatedly set on each arrival of the time zone, and it is possible to prevent forgetting to perform the setting or cancellation.

According to the fifth aspect of the present invention, there are provided vibrator controlling means for controlling a vibrator for signaling call incoming; and call-incoming-operation limiting function controlling means for instructing the vibrator controlling means at the time set by a user to effect a changeover to signaling of call incoming by the vibrator. Hence, the user is able to know call incoming without imparting discomfort and annoyance to the surrounding people.

According to the sixth aspect of the present invention, at a starting time of a time zone set by the user, the call-incoming-operation limiting function controlling means instructs the vibrator controlling means to effect a changeover to the signaling of call incoming by the vibrator and, at an ending time of the time zone, instructs the vibrator controlling means to stop the changeover. Once this time zone is set, a changeover to signaling of call incoming by the vibrator is automatically effected each time that time zone arrives periodically. Hence, it is possible to dispense with the trouble with which the signaling method is repeatedly set on each arrival of the time zone, and it is possible to prevent forgetting to perform the setting or cancellation.

According to the seventh aspect of the present invention, there are provided answering-phone-function controlling means for controlling an answering phone function; and call-incoming-operation limiting function controlling means for instructing the answering-phone-function controlling means at the time set by a user to use the answering phone function during call incoming. Hence, a call-incoming response can be made without imparting discomfort and annoyance to the surrounding people.

According to the eighth aspect of the present invention, at a starting time of a time zone set by the user, the call-incoming-operation limiting function controlling means instructs the answering-phone-function controlling means to use the answering phone function and, at an ending time of the time zone, instructs the answering-phone-function controlling means not to use the answering phone function. Once this time zone is set, a changeover to the call-incoming response by the answering phone function is automatically effected each time that time zone arrives periodically. Hence, it is possible to dispense with the trouble with which the responding method is repeatedly set on each arrival of the time zone, and it is possible to prevent forgetting to perform the setting or cancellation.

According to the ninth aspect of the present invention, there are provided at least two of ringer-tone-volume controlling means for controlling a tone volume of a ringer during call incoming, call-incoming-pattern controlling means for controlling a ringing pattern of the ringer during call incoming, vibrator controlling means for controlling a vibrator for signaling call incoming, and answering-phone-function controlling means for controlling an answering phone function; and call-incoming-operation limiting function controlling means for instructing the controlling means at the time set by a user to effect a changeover of operation during call incoming. Hence, it is possible to realize the operation of the telephones according to the first, third, fifth and seventh aspects by a single apparatus.

According to the tenth aspect of the present invention, there is further provided signaling means for signaling that the time measured by the clock means and the time set by the user have coincided. Hence, the point of time in changing over the call-incoming operation mode can be signaled to the user.

According to the eleventh aspect of the present invention, there is further provided call-incoming-operation change information setting means for holding the time which has been set over a plurality of times by the user, and for setting average time of the timing as the time set by the user. Accordingly, even if the user does not set the time zone, the time zone for limiting the call-incoming operation can be set automatically.

According to the twelfth aspect of the present invention, there is provided a method of limiting call-incoming operation of a telephone, comprising the step of: automatically changing over a tone volume of a ringer during call incoming to a set tone volume each time a time zone set by a user periodically arrives. By providing a setting to allow the tone volume of the ringer to be automatically lowered during a time zone when the surroundings become quiet, the user is able to know call incoming without imparting discomfort and annoyance to the surrounding people.

According to the thirteenth aspect of the present invention, there is provided a method of limiting call-incoming operation of a telephone, comprising the step of: automatically changing over a ringing pattern of a ringer during call incoming to a set ringing pattern each time a time zone set by a user periodically arrives. By providing a setting to allow the ringing pattern to be automatically changed over to a quiet pattern during the time zone when the surroundings become quiet, the user is able to know call incoming without imparting discomfort and annoyance to the surrounding people.

According to the fourteenth aspect of the present invention, there is provided a method of limiting call-incoming operation of a telephone, comprising the step of: automatically changing over a signaling method during call incoming to a method of signaling by vibration each time a time zone set by a user periodically arrives. By providing a setting to allow the signaling method to be automatically changed over to one using vibration during the time zone when the surroundings become quiet, the user is able to know call incoming without imparting discomfort and annoyance to the surrounding people.

According to the fifteenth aspect of the present invention, there is provided a method of limiting call-incoming operation of a telephone, comprising the step of: automatically changing over a response during call incoming to a response by an answering phone function each time a time zone set by a user periodically arrives. Even if the user does not operate on each such occasion, the response during a time zone when the surroundings become quiet or during a time zone when a person is absent can be changed over to the answering phone function. Hence, it is possible to prevent forgetting to perform the setting or cancellation.

BRIEF DESCRIPTION OF THE PREFERRED EMBODIMENTS

DETAILED DESCRIPTION OF THE PREFERRED EMBODIMENTS

Hereafter, a description will be given of the embodiments of the present invention with reference to the drawings.

First Embodiment

A telephone with a call-incoming-operation limiting function in accordance with a first embodiment is able to automatically reduce the volume of the call-incoming tone during a set time zone.

Figure 1:
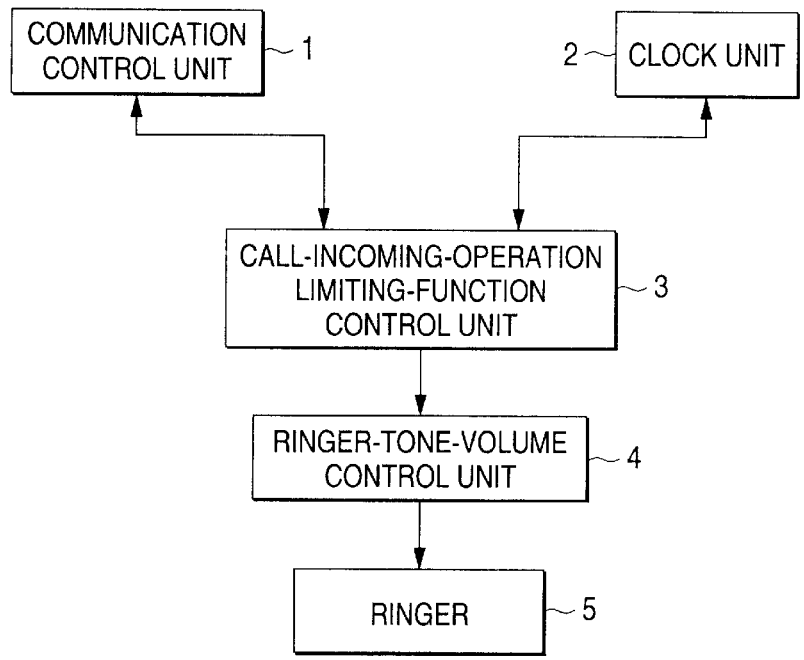
FIG. 1 is a block diagram of a telephone with a call-incoming-operation limiting function in accordance with a first embodiment of the present invention.

As shown in FIG. 1, this telephone is provided with a communication control unit 1 for controlling call origination and termination as well as a call, a clock unit 2 for holding the present time, a ringer 5 for generating the ringing tone, a ringer-tone-volume control unit 4 for controlling the tone volume of the ringer 5, and a call-incoming-operation limiting-function control unit 3 for instructing the ringer-tone-volume control unit 4 to change the tone volume of the ringer during a time zone set by a user.

This call-incoming-operation limiting-function control unit 3 holds ringer-tone-volume change information which describes the relationship between the time zone set by the user and the tone volume of the ringer during that time zone. The call-incoming-operation limiting-function control unit 3 instructs the ringer-tone-volume control unit 4 to change the tone volume of the ringer to a set tone volume if the time of the clock unit 2 has coincided with the time zone described in the ringer-tone-volume change information.

Figure 2:
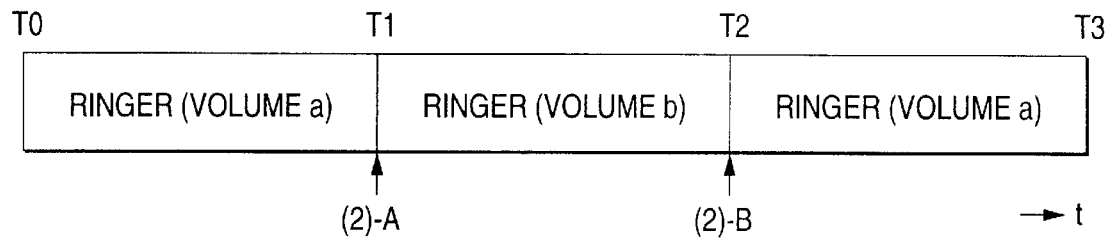
FIG. 2 is a diagram illustrating the transition of operation in the telephone with a call-incoming-operation limiting function in accordance with the first embodiment.

FIG. 2 is a diagram explaining the operation of this telephone with a call-incoming-operation limiting function. Here, a description will be given of a case where, every day, the call-incoming tone volume of the telephone during the usual time is set to a tone volume a, while the call-incoming tone volume during a call-incoming-operation limited time zone T1 to T2 is set to a tone volume b.

First, by using an operating portion of the telephone with a call-incoming-operation limiting function, the user sets the starting time T1 and the ending time T2 of the call-incoming-operation limited time zone as well as the tone volume b of the ringer 5 during that call-incoming-operation limited time zone. The thus-set starting time T1 and the ending time T2 of the call-incoming-operation limited time zone and the tone volume b are held in the call-incoming-operation limiting-function control unit 3 as the ringer-tone-volume change information.

When the time of the clock unit 2 has coincided with the starting time T1 of the call-incoming-operation limited time zone, the call-incoming-operation limiting-function control unit 3 holding the ringer-tone-volume change information instructs the ringer-tone-volume control unit 4 to change the tone volume of the ringer to the tone volume b on the basis of the ringer-tone-volume change information. In response, the ringer-tone-volume control unit 4 causes the ringer 5 to ring with the tone volume b when the operation during call incoming is instructed from the communication control unit 1.

In addition, when the time of the clock unit 2 has coincided with the ending time T2 of the call-incomingoperation limited time zone, the call-incoming-operation limiting-function control unit 3 instructs the ringer-tone-volume control unit 4 to stop the change to the tone volume b on the basis of the ringer-tone-volume change information. In response, the ringer-tone-volume control unit 4 causes the ringer 5 to ring with its former tone volume a when the operation during call incoming is instructed from the communication control unit 1.

Thus, in this telephone, after a time zone is designated, the tone volume of the ringer during that time zone can be limited. Accordingly, by setting the tone volume of the ringer to a lower level during, for example, the time zone in and after the evening when the surroundings become quiet, the user is able to know call incoming by the call-incoming tone of a volume which does not annoy people in the surroundings even if there is call incoming during that time zone.

It should be noted that signaling of call incoming by means of a light-emitting means may also be effected.

Further, the time zone during which the tone volume of the ringer is limited may be set not only in periods of 24 hours or one day but also in periods of one week or one month, or may be set only once, e.g., year XX, month YY, and day ZZ, AA hour a.m.

Second Embodiment

A telephone with a call-incoming-operation limiting function in accordance with a second embodiment is able to change a call-incoming pattern by designating a time zone.

Figure 3:
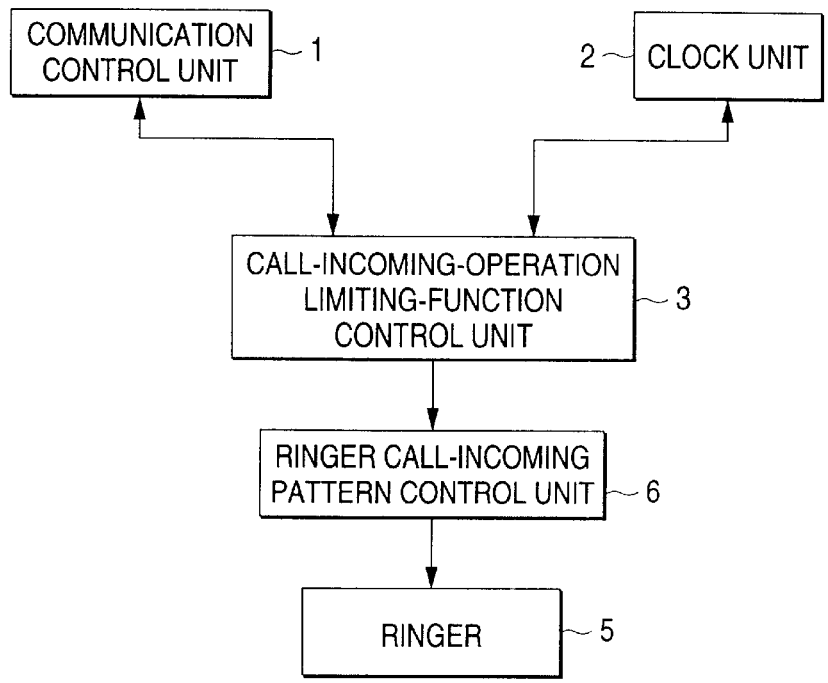
FIG. 3 is a block diagram of the telephone with a call-incoming-operation limiting function in accordance with a second embodiment of the present invention.

As shown in FIG. 3, this telephone is provided with the communication control unit 1, the clock unit 2, the call-incoming-operation limiting-function control unit 3, and the ringer 5, as well as a ringer call-incoming pattern control unit 6 for controlling the ringing pattern (call-incoming pattern) of the ringer 5.

The call-incoming-operation limiting-function control unit 3 of this telephone holds call-incoming pattern change information which describes the relationship between the time zone set by the user and the call-incoming pattern during that time zone. The call-incoming-operation limiting-function control unit 3 instructs the ringer call-incoming pattern control unit 6 to change the call-incoming pattern of the ringer 5 if the time of the clock unit 2 has coincided with the time zone described in the call-incoming pattern change information.

Figure 4:
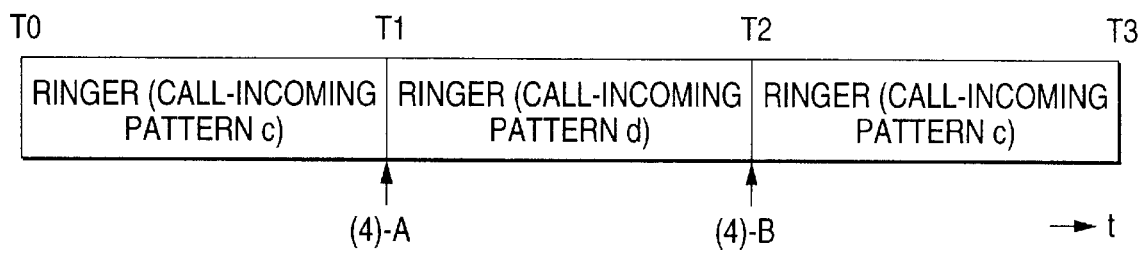
FIG. 4 is a diagram illustrating the transition of operation in the telephone with a call-incoming-operation limiting function in accordance with the second embodiment.

FIG. 4 is a diagram explaining the operation of this telephone with a call-incoming-operation limiting function. Here, a description will be given of a case where, every day, the ringer 5 is caused to ring with a call-incoming pattern c as the call-incoming pattern of the telephone during the usual time, while the ringer 5 is caused to ring with a call-incoming pattern d during the call-incoming-operation limited time zone T1 to T2.

First, by using the operating portion of this telephone, the user sets the starting time T1 and the ending time T2 of the call-incoming-operation limited time zone as well as the call-incoming pattern d of the ringer 5 during that call-incoming-operation limited time zone. The thus-set starting time T1 and the ending time T2 of the call-incoming-operation limited time zone and the call-incoming pattern d are held in the call-incoming-operation limiting-function control unit 3 as the call-incoming pattern change information.

When the time of the clock unit 2 has coincided with the starting time T1 of the call-incoming-operation limited time zone, the call-incoming-operation limiting-function control unit 3 holding the call-incoming pattern change information instructs the ringer call-incoming pattern control unit 6 to change the call-incoming pattern to the call-incoming pattern d on the basis of the call-incoming pattern change information. In response, the ringer call-incoming pattern control unit 6 causes the ringer 5 to ring with the call-incoming pattern d when the operation during call incoming is instructed from the communication control unit 1.

In addition, when the time of the clock unit 2 has coincided with the ending time T2 of the call-incoming-operation limited time zone, the call-incoming-operation limiting-function control unit 3 instructs the ringer call-incoming pattern control unit 6 to stop the change to the call-incoming pattern d on the basis of the call-incoming pattern change information. In response, the ringer call-incoming pattern control unit 6 causes the ringer 5 to ring with its former call-incoming pattern c when the operation during call incoming is instructed from the communication control unit 1.

As for the call-incoming pattern, it is possible to set various call-incoming patterns by changing the tone, the tone interval, the melody, and the like. As the call-incoming pattern during the call-incoming-operation limited time zone, it is possible to reduce discomfort imparted to the surrounding people.

Thus, in this telephone, after a time zone is designated, the call-incoming pattern during that time zone can be designated. Accordingly, by setting the call-incoming pattern to a quiet one during, for example, the time zone in and after the evening when the surroundings become quiet, the user is able to know call incoming by the call-incoming tone with a quiet call-incoming pattern without annoying people in the surroundings even if there is call incoming during that time zone.

It should be noted that, in this telephone as well, signaling of call incoming by means of the light-emitting means may also be effected in conjunction with the change of the call-incoming pattern. Further, the time zone for which the change of the call-incoming pattern is designated may be set not only in periods of one day but also in periods of one week or one month, or may be set only once by designating the date and the time.

Third Embodiment

A telephone with a call-incoming-operation limiting function in accordance with a third embodiment is able to effect a changeover to signaling of call incoming by means of vibration.

Figure 5:
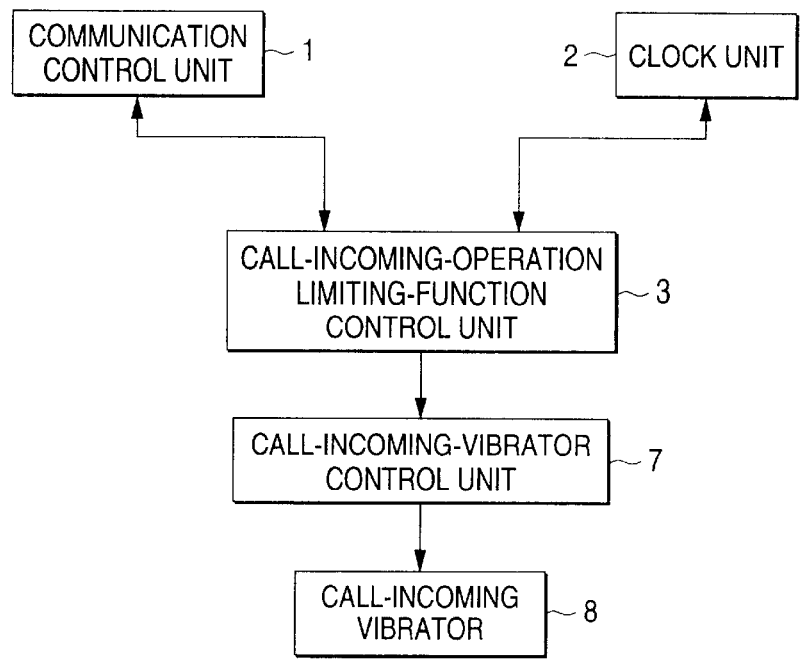
FIG. 5 is a block diagram of the telephone with a call-incoming-operation limiting function in accordance with a third embodiment of the present invention.

As shown in FIG. 5, this telephone is provided with the communication control unit 1, the clock unit 2, and the call-incoming-operation limiting-function control unit 3, as well as a call-incoming vibrator 8 for signaling call incoming by means of vibration and a call-incoming-vibrator control unit 7 for operating the call-incoming vibrator 8 during call incoming.

The call-incoming-operation limiting-function control unit 3 of this telephone holds call-incoming-vibrator operation change information which describes the time zone which is set by the user and during which signaling of call incoming is effected by the vibrator. The call-incoming-operation limiting-function control unit 3 instructs the call-incoming-vibrator control unit 7 to control the call-incoming vibrator 8 during call incoming if the time of the clock unit 2 has coincided with the time zone described in the call-incoming-vibrator operation change information.

Figure 6:
FIG. 6 is a diagram illustrating the transition of operation in the telephone with a call-incoming-operation limiting function in accordance with the third embodiment.

FIG. 6 is a diagram explaining the operation of this telephone with a call-incoming-operation limiting function. Here, a description will be given of a case where, every day, call incoming is signaled by causing the ringer to ring during the usual time, while call incoming is signaled by using the vibrator during the call-incoming-operation limited time zone T1 to T2.

First, by using the operating portion of this telephone, the user sets the starting time T1 and the ending time T2 of the call-incoming-operation limited time zone, and sets the call-incoming vibrator 8 as a call-incoming signaling means during that call-incoming-operation limited time zone. The thus-set starting time T1 and the ending time T2 of the call-incoming-operation limited time zone and the call-incoming vibrator 8 as the signaling means are held in the call-incoming-operation limiting-function control unit 3 as the call-incoming-vibrator operation change information.

When the time of the clock unit 2 has coincided with the time T1, the call-incoming-operation limiting-function control unit 3 holding the call-incoming-vibrator operation change information instructs the call-incoming-vibrator control unit 7 to control the call-incoming vibrator 8 on the basis of the call-incoming-vibrator operation change information. In response, the call-incoming-vibrator control unit 7 causes the call-incoming vibrator 8 to vibrate to effect signaling when the operation during call incoming is instructed from the communication control unit 1.

In addition, when the time of the clock unit 2 has coincided with the time T2, the call-incoming-operation limiting-function control unit 3 instructs the call-incoming-vibrator control unit 7 to stop controlling the call-incoming vibrator 8 on the basis of the call-incoming-vibrator operation change information. When there is call incoming afterwards, usual signaling by the ringer is performed.

Thus, in this telephone, after a time zone is designated, the signaling means during call incoming can be changed over to the vibrator. Accordingly, by setting the vibrator as the signaling means during, for example, the time zone in and after the evening when the surroundings become quiet, the user is able to know call incoming by the vibration without annoying people in the surroundings even if there is call incoming during that time zone.

It should be noted that, in this telephone as well, signaling of call incoming by means of the light-emitting means may also be effected during the time zone when the call-incoming vibrator is used. Further, that time zone may be set not only in periods of one day but also in periods of one week or one month, or may be set only once by designating the date and the time.

Fourth Embodiment

A telephone with a call-incoming-operation limiting function in accordance with a fourth embodiment is able to effect a changeover to an answering phone function after designating a time zone.

Figure 7:
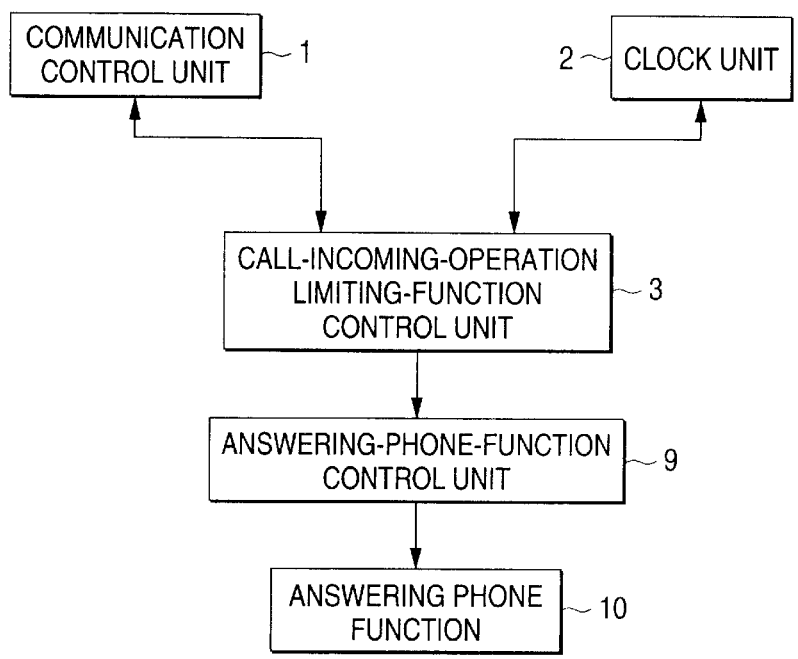
FIG. 7 is a block diagram of the telephone with a call-incoming-operation limiting function in accordance with a fourth embodiment of the present invention.

As shown in FIG. 7, this telephone is provided with the communication control unit 1, the clock unit 2, and the call-incoming-operation limiting-function control unit 3, as well as an answering phone function 10 for responding to call incoming and recording a received message, and an answering-phone-function control unit 9 for controlling the answering phone function 10 during call incoming.

The call-incoming-operation limiting-function control unit 3 of this telephone holds answering-phone-function operation change information which describes the time zone which is-set by the user and during which a changeover to the answering phone function is effected. The call-incoming-operation limiting-function control unit 3 instructs the answering-phone-function control unit 9 to use the answering phone function 10 during call incoming if the time of the clock unit 2 has coincided with the time zone described in the answering-phone-function operation change information.

Figure 8:
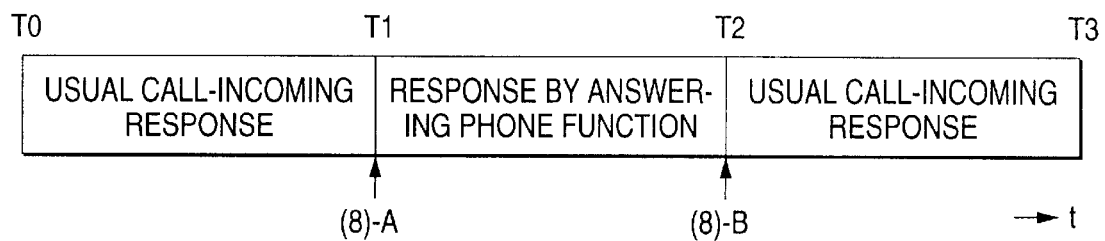
FIG. 8 is a diagram illustrating the transition of operation in the telephone with a call-incoming-operation limiting function in accordance with the fourth embodiment.

FIG. 8 is a diagram explaining the operation of this telephone with a call-incoming-operation limiting function. Here, a description will be given of a case where, every day, a usual call-incoming response is made during the usual time, while a call-incoming response is made by means of the answering phone function during the call-incoming-operation limited time zone T1 to T2.

First, by using the operating portion of this telephone, the user sets the starting time T1 and the ending time T2 of the call-incoming-operation limited time zone, and sets the answering phone function 10 as a responding means during that call-incoming-operation limited time zone. The thus-set starting time T1 and the ending time T2 of the call-incoming-operation limited time zone and the answering phone function 10 as the responding means are held in the call-incoming-operation limiting-function control unit 3 as the answering-phone-function operation change information.

When the time of the clock unit 2 has coincided with the starting time T1 of the call-incoming-operation limited time zone, the call-incoming-operation limiting-function control unit 3 holding the answering-phone-function operation change information instructs the answering-phone-function control unit 9 to control the answering phone function 10 during call incoming on the basis of the answering-phone-function operation change information. In response, the answering-phone-function control unit 9 causes the answering phone function 10 to operate when the operation during call incoming is instructed from the communication control unit 1.

In addition, when the time of the clock unit 2 has coincided with the ending time T2 of the call-incoming-operation limited time zone, the call-incoming-operation limiting-function control unit 3 instructs the answering-phone-function control unit 9 to stop controlling the answering phone function 10 on the basis of the answering-phone-function operation change information. When there is call incoming afterwards, the usual call-incoming response is made.

Thus, in this telephone, after a time zone is designated, a changeover to the answering phone function can be effected. Once the user effects the setting of changing over the response in the night to the answering phone function, the changeover to the answering phone during the designated time zone can be effected automatically.

Further, that time zone may be set not only in periods of one day but also in periods of one week or one month, or may be set only once by designating the date and the time.

Fifth Embodiment

A telephone with a call-incoming-operation limiting function in accordance with a fifth embodiment has a combination of the functions of the first, second, third, and fourth embodiments.

Figure 9:
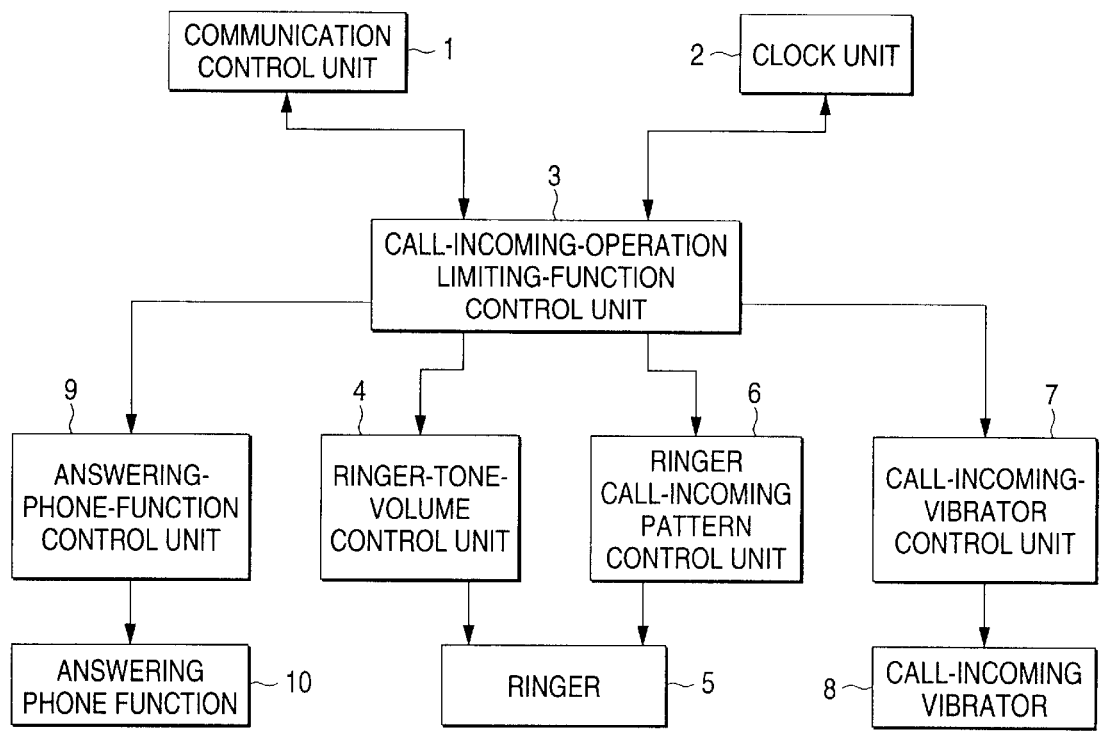
FIG. 9 is a block diagram of the telephone with a call-incoming-operation limiting function in accordance with a fifth embodiment of the present invention.

As shown in FIG. 9, this telephone is provided with the communication control unit 1 for controlling call origination and termination as well as a call; the clock unit 2 for holding the present time; the ringer 5 for generating the ringing tone; the ringer-tone-volume control unit 4 for controlling the tone volume of the ringer 5; the ringer call-incoming pattern control unit 6 for controlling the call-incoming pattern of the ringer 5; the call-incoming vibrator 8 for signaling call incoming by means of vibration; the call-incoming-vibrator control unit 7 for operating the call-incoming vibrator 8 during call incoming; the answering phone function 10 for responding to call incoming and recording a received message; the answering-phone-function control unit 9 for controlling the answering phone function 10 during call incoming; and the call-incoming-operation limiting-function control unit 3 for changing the call-incoming operation during the time zone set by the user to the one set by the user.

Figure 10:
FIG. 10 is a diagram illustrating the transition of operation in the telephone with a call-incoming-operation limiting function in accordance with the fifth embodiment.

FIG. 10 is a diagram explaining the operation of this telephone with a call-incoming-operation limiting function. Here, a description will be given of a case where, every day, usual signaling of call incoming by means of the ringer 5 is effected during a time zone T0 to T1, signaling of call incoming by means of the call-incoming vibrator 8 is effected during a time zone T1 to T2, and a call-incoming response is made by using the answering phone function is effected during a time zone T2 to T3.

First, by using the operating portion of this telephone, the user sets the starting time T1 and the ending time T2 of the call-incoming-operation limited time zone T1 to T2, sets the starting time T2 and the ending time T3 of the call-incoming-operation limited time zone T2 to T3, sets the call-incoming vibrator 8 as the call-incoming signaling means for the set call-incoming-operation limited time zone T1 to T2, and sets the answering phone function as the call-incoming responding means for the set call-incoming-operation limited time zone T2 to T3. The relationship between, on one hand, the thus-set starting time T1 and the ending time T2 of the call-incoming-operation limited time zone and, on the other hand, the call-incoming vibrator, as well as the relationship between, on one hand, the starting time T2 and the ending time T3 of the call-incoming-operation limited time zone and, on the other hand, the answering phone function, are held in the call-incoming-operation limiting-function control unit 3 as the call-incoming-vibrator operation change information and the answering-phone-function operation change information.

When the time of the clock unit 2 has coincided with the starting time T1 of the call-incoming-operation limited time zone T1 to T2, the call-incoming-operation limiting-function control unit 3 holding the call-incoming-vibrator operation change information and the answering-phone-function operation change information instructs the call-incoming-vibrator control unit 7 to control the call-incoming vibrator 8 during call incoming on the basis of the call-incoming-vibrator operation change information. In response, the call-incoming-vibrator control unit 7 causes the call-incoming vibrator 8 to vibrate to effect signaling when the operation during call incoming is instructed from the communication control unit 1.

In addition, when the time of the clock unit 2 has coincided with the time T2, the call-incoming-operation limiting-function control unit 3 instructs the call-incoming-vibrator control unit 7 to stop controlling the call-incoming vibrator 8 on the basis of the call-incoming-vibrator operation change information, and also instructs the answering-phone-function control unit 9 to control the answering phone function 10 during call incoming on the basis of the answering-phone-function operation change information. In response, the answering-phone-function control unit 9 causes the answering phone function 10 to operate when the operation during call incoming is instructed from the communication control unit 1.

In addition, when the time of the clock unit 2 has coincided with the ending time T3 of the call-incoming-operation limited time zone, the call-incoming-operation limiting-function control unit 3 instructs the answering-phone-function control unit 9 to stop controlling the answering phone function 10 on the basis of the answering-phone-function operation change information. When there is call incoming afterwards, the usual call-incoming response is made.

Thus, in this telephone, after a time zone is designated, the call-incoming signaling means can be changed over to the vibrator, a changeover to the answering phone can be effected, and the tone volume or the ringing pattern of the ringer can be changed over.

Further, that time zone may be set not only in periods of one day but also in periods of one week or one month.

Sixth Embodiment

A telephone with a call-incoming-operation limiting function in accordance with a sixth embodiment is able to inform the user of the fact that the operation has proceeded to the call-incoming-operation limited time zone.

Figure 11:
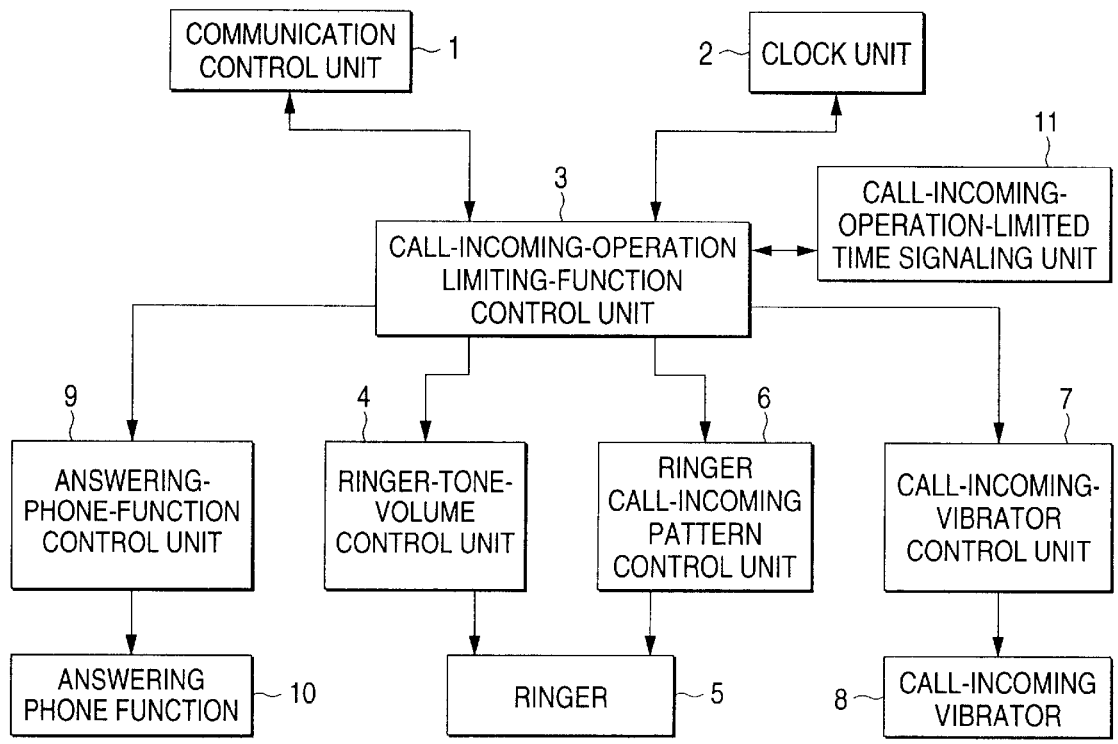
FIG. 11 is a block diagram of the telephone with a call-incoming-operation limiting function in accordance with a sixth embodiment of the present invention.

As shown in FIG. 11, this telephone is provided with a call-incoming-operation-limited time signaling unit 11 for signaling the user that the time has arrived for changing the call-incoming operation. The other arrangements are the same as those of the fifth embodiment (FIG. 9).

Figure 12:
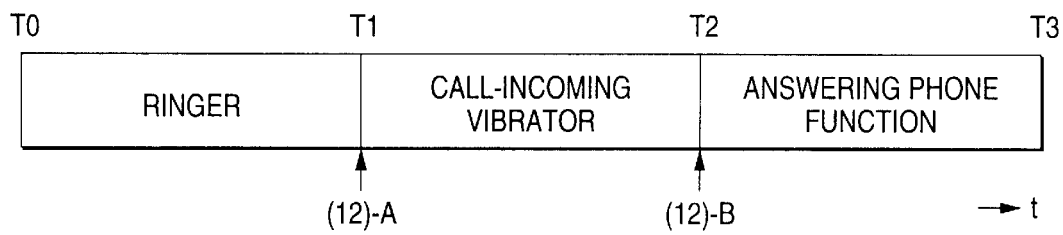
FIG. 12 is a diagram illustrating the transition of operation in the telephone with a call-incoming-operation limiting function in accordance with the sixth embodiment.

In this telephone, as described in the fifth embodiment, when the limitation of the call-incoming operation shown in FIG. 12 is effected, if, by using the operating portion, the user sets the starting time T1 and the ending time T2 of the call-incoming-operation limited time zone T1 to T2, sets the starting time T2 and the ending time T3 of the call-incoming-operation limited time zone T2 to T3, sets the call-incoming vibrator 8 as the call-incoming signaling means for that call-incoming-operation limited time zone T1 to T2, and sets the answering phone function as the call-incoming responding means for the call-incoming-operation limited time zone T2 to T3, then the relationship between, on one hand, the thus-set starting time T1 and the ending time T2 of the call-incoming-operation limited time zone and, on the other hand, the call-incoming vibrator, as well as the relationship between, on one hand, the starting time T2 and the ending time T3 of the call-incoming-operation limited time zone and, on the other hand, the answering phone function, are held in the call-incoming-operation limiting-function control unit 3 as the call-incoming-vibrator operation change information and the answering-phone-function operation change information.

At this time, information on the starting time T1 and the ending time T2 of the call-incoming-operation limited time zone T1 to T2, as well as the starting time T2 and the ending time T3 of the call-incoming-operation limited time zone T2 to T3, is concurrently stored in the call-incoming-operation-limited time signaling unit 11.

At the starting time T1 of the call-incoming-operation limited time zone T1 to T2, the call-incoming-operation limiting-function control unit 3 holding the call-incoming-vibrator operation change information and the answering-phone-function operation change information instructs the call-incoming-vibrator control unit 7 to control the call-incoming vibrator 8 during call incoming, as described in the fifth embodiment and, at the time T2, also instructs the answering-phone-function control unit 9 to control the answering phone function 10 during call incoming.

Meanwhile, when the time of the clock unit 2 has coincided with the time T1, T2, and T3, the call-incomingoperation-limited time signaling unit 11 notifies the call-incoming-operation limiting-function control unit 3 to that effect. The call-incoming-operation limiting-function control unit 3, after being notified, instructs the ringer-tone-volume control unit 4 or the ringer call-incoming pattern control unit 6, and causes the ringer 5 to operate.

Thus, with this telephone, since the ringer rings when the call-incoming operation mode is changed over, the user is able to recognize that there has been a change in the call-incoming operation mode.

It should be noted that the changeover of the call-incoming operation mode can be signaled not only by operating the ringer but by using the call-incoming vibrator or the light-emitting means.

Seventh Embodiment

A telephone with a call-incoming-operation limiting function in accordance with a seventh embodiment automatically sets a call-incoming-operation limited time zone by referring to the time zones set in the past.

Figure 13:
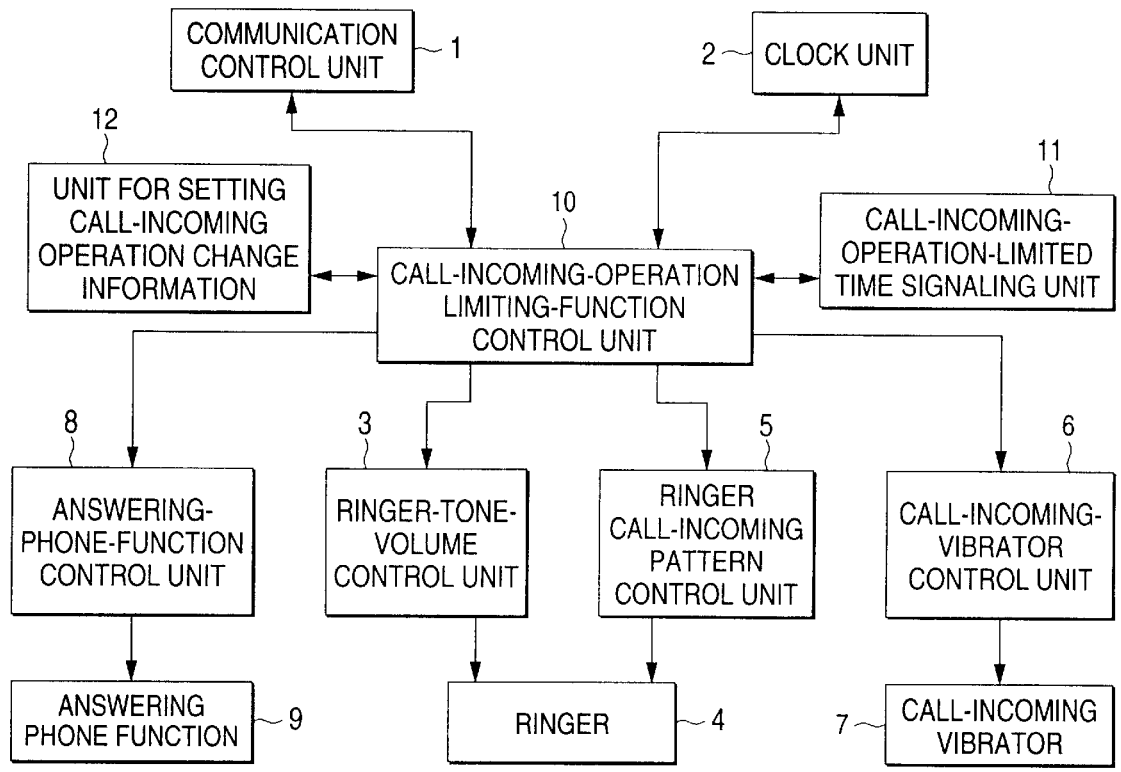
FIG. 13 is a block diagram of the telephone with a call-incoming-operation limiting function in accordance with a seventh embodiment of the present invention.

As shown in FIG. 13, this telephone is provided with a unit 12 for setting call-incoming operation change information. This unit 12 for setting call-incoming operation change information holds records of the set time of changing the call-incoming operation, which have hitherto been changed by the user, and sets the time of changing the call-incoming operation by averaging the held time when the change has been effected a predetermined number of times. The other arrangements are the same as those of the sixth embodiment (FIG. 11).

Figure 15:
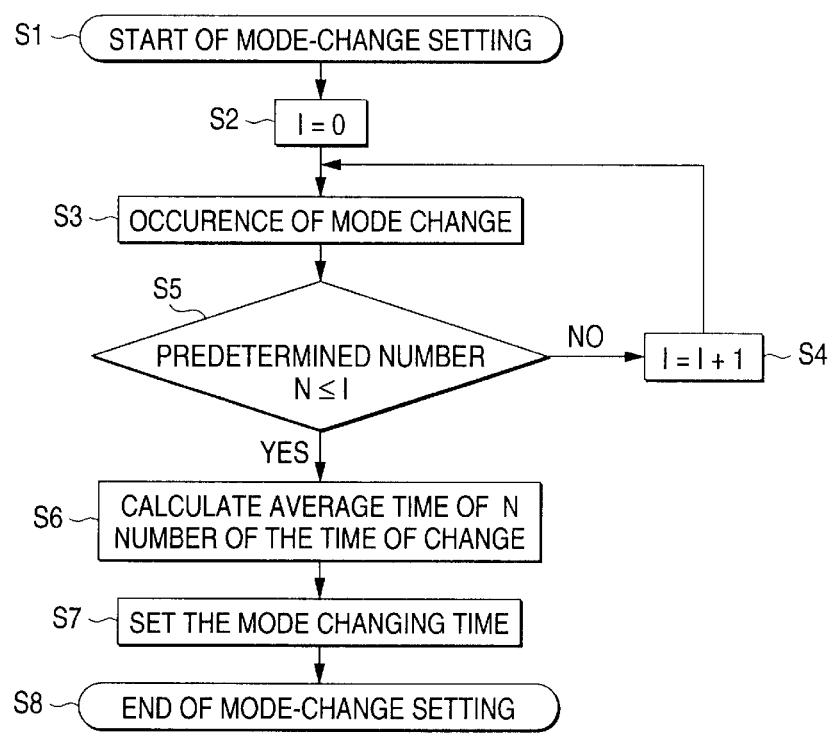
FIG. 15 is a flowchart illustrating the operation of the telephone with a call-incoming-operation limiting function in accordance with the seventh embodiment.

The unit 12 for setting call-incoming operation change information of this telephone sets the time of changing the call-incoming operation in the procedure shown in FIG. 15.

Step 1: When a mode for setting the time of changing the call-incoming operation is designated, Step 2: a counter I is initialized.

Step 3: When the user effects the operation of changing the call-incoming operation, the pattern of that operation change (e.g., a pattern of change from the mode of signaling call incoming by the ringer to a mode of signaling call incoming by the call-incoming vibrator) is detected, and Step 5: a comparison is made between the counter value of that pattern and a predetermined number of times (a predetermined number of times N of mode change for determining the time setting). If the number of changes is less than or equal to the predetermined number of times N, Step 4: the counter value of that pattern is incremented by 1, and the set time of change is recorded.

Step 5: When the mode changing operation is performed, and if the counter value has reached the predetermined number of times N when a comparison is made between the counter value of that pattern and the predetermined number of times N, Step 6: the average time of the N number of the time of change is calculated, Step 7: the calculated average time is set as the mode changing time of that pattern, and Step 8: mode-change setting processing ends.

It should be noted that the patterns of mode change can be detected from combinations of all the call-incoming signaling means set for the time zone during which the call-incoming operation is limited.

In addition, as for the method of calculating the average time, apart from determining the average time as an arithmetical mean, a central value in the distribution of the detected time may be set as the time to be determined. Still alternatively, a determined time zone may be divided into certain time periods to obtain a frequency distribution, and its mode may be set as the time to be determined.

Figure 14:
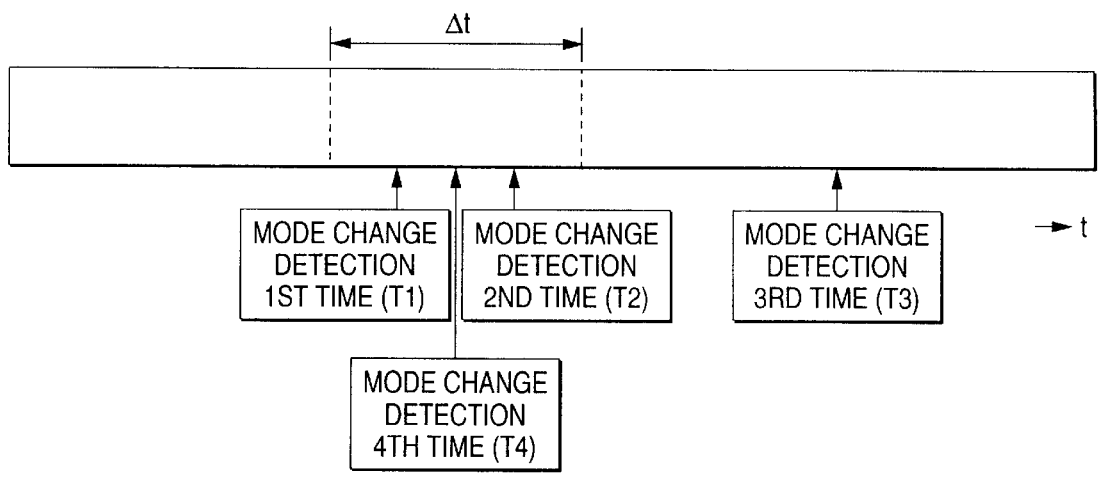
FIG. 14 is a diagram illustrating the transition of operation in the telephone with a call-incoming-operation limiting function in accordance with the seventh embodiment.

In addition, as shown in FIG. 14, an arrangement may be provided such that a time period Et is defined in advance, and the detected mode changes (T1, T2, and T4) which fall within that time period are made subject to averaging processing, while the mode change (T3) which falls outside that time period is discarded.

Thus, with this telephone, the time for limiting the call-incoming operation can be automatically set by referring to the time set in the past.

As is apparent from the foregoing description, the telephone with a call-incoming-operation limiting function in accordance with the present invention is capable of automatically limiting the call-incoming operation during a set time zone and of signaling call incoming without imparting discomfort and annoyance to the surrounding people.

In addition, it is possible to dispense with the trouble of providing the setting for limiting the call-incoming operation every day, and it is possible to prevent forgetting to perform the setting or canceling thereof.

Further, with the telephone with a call-incoming-operation limiting function which is provided with the signaling means for signaling the arrival of the time set by the user, the point of time in changing over the call-incoming operation mode can be signaled to the user.

Further, with the telephone with a call-incoming-operation limiting function which is provided with the call-incoming-operation change information setting means, even if the user does not set the time zone, the time zone for limiting the call-incoming operation can be set automatically by referring to the time zones set in the past.

In addition, in accordance with the method of limiting call-incoming operation of a telephone, the user can be notified of call incoming without imparting discomfort and annoyance to the surrounding people, and it is possible to dispense with the trouble of providing a setting every day and prevent forgetting to perform the setting or cancellation.

In addition, in accordance with the method in which the call-incoming response during the time zone set by the user is effected by the answering phone function, the response during a time zone when the surroundings become quiet or during a time zone when a person is absent can be automatically effected by the answering phone function.

What is claimed is:

1. A telephone with a call-incoming-operation limiting function which has clock means for measuring the time and changes over call-incoming operation according to the time, comprising:

ringer-tone-volume controlling means for controlling a tone volume of a ringer during call incoming; and call-incoming-operation limiting function controlling means for instructing said ringer-tone-volume controlling means at the time set by a user to change over the tone volume to a tone volume set by the user, and call-incoming-operation change information setting means for holding the time which has been set over a plurality of times by the user, and for setting average time of the timing as the time set by the user.

2. The telephone with a call-incoming-operation limiting function according to claim 1, wherein, at a starting time of a time zone set by the user, said call-incoming-operation limiting function controlling means instructs said ringer-tone-volume controlling means to effect a changeover to the tone volume set by the user and, at an ending time of the time zone, instructs said ringer-tone-volume controlling means to stop the changeover.

3. A telephone with a call-incoming-operation limiting function which has clock means for measuring the time and changes over call-incoming operation according to the time, comprising:

call-incoming-pattern controlling means for controlling a ringing pattern of a ringer during call incoming; and call-incoming-operation limiting function controlling means for instructing said call-incoming pattern controlling means at the time set by a user to change over the ringing pattern to a ringing pattern set by the user, and call-incoming-operation change information setting means for holding the time which has been set over a plurality of times by the user, and for setting average time of the timing as the time set by the user.

4. The telephone with a call-incoming-operation limiting function according to claim 3, wherein, at a starting time of a time zone set by the user, said call-incoming-operation limiting function controlling means instructs said call-incoming-pattern controlling means to effect a changeover to the ringing pattern set by the user and, at an ending time of the time zone, instructs said call-incoming-pattern controlling means.

5. A telephone with a call-incoming-operation limiting function which has clock means for measuring the time and changes over call-incoming operation according to the time, comprising:

vibrator controlling means for controlling a vibrator for signaling call incoming; and call-incoming-operation limiting function controlling means for instructing said vibrator controlling means at the time set by a user to effect a changeover to signaling of call incoming by said vibrator, and call-incoming-operation change information setting means for holding the time which has been set over a plurality of times by the user, and for setting average time of the timing as the time set by the user.

6. The telephone with a call-incoming-operation limiting function according to claim 5, wherein, at a starting time of a time zone set by the user, said call-incoming-operation limiting function controlling means instructs said vibrator controlling means to effect a changeover to the signaling of call incoming by said vibrator and, at an ending time of the time zone, instructs said vibrator controlling means to stop the changeover.

7. A telephone with a call-incoming-operation limiting function which has clock means for measuring the time and changes over call-incoming operation according to the time, comprising:

answering-phone-function controlling means for controlling an answering phone function; and call-incoming-operation limiting function controlling means for instructing said answering-phone-function controlling means at the time set by a user to use the answering phone function during call incoming, and call-incoming-operation change information setting means for holding the time which has been set over a plurality of times by the user, and for setting average time of the timing as the time set by the user.

8. The telephone with a call-incoming-operation limiting function according to claim 7, wherein, at a starting time of a time zone set by the user, said call-incoming-operation limiting function controlling means instructs said answering-phone-function controlling means to use the answering phone function and, at an ending time of the time zone, instructs said answering-phone-function controlling means not to use the answering phone function.

9. A method of limiting call-incoming operation of a telephone, comprising the steps of:

automatically changing over a tone volume of a ringer during call incoming to a set tone volume each time a time zone set by a user periodically arrives, holding a plurality of individual time settings that have been individually set by the user in call-incoming-operation change information setting means, and setting an average of the plurality of individual time settings in the call-incoming-operation change information setting means as the time set by the user.

10. A method of limiting call-incoming operation of a telephone, comprising the steps of:

automatically changing over a ringing pattern of a ringer during call incoming to a set ringing pattern each time a time zone set by a user periodically arrives, holding a plurality of individual time settings that have been individually set by the user in call-incoming-operation change information setting means, and setting an average of the plurality of individual time settings in the call-incoming-operation change information setting means as the time set by the user.

11. A method of limiting call-incoming operation of a telephone, comprising the steps of:

automatically changing over a signaling method of a ringer during call incoming to a method of signaling by vibration each time a time zone set by a user periodically arrives, holding a plurality of individual time settings that have been individually set by the user in call-incoming-operation change information setting means, and setting an average of the plurality of individual time settings in the call-incoming-operation change information setting means as the time set by the user.

12. A method of limiting call-incoming operation of a telephone, comprising the steps of:

automatically changing over a response during call incoming to a response by an answering phone function each time a time zone set by a user periodically arrives, holding a plurality of individual time settings that have been individually set by the user in call-incoming-operation change information setting means, and setting an average of the plurality of individual time settings in the call-incoming-operation change information setting means as the time set by the user.

13. A telephone with a call-incoming-operation limiting function which has clock means for measuring the time and changes over call-incoming operation according to the time, comprising:

at least one controlling means selected among ringer-tone-volume controlling means for controlling a tone volume of a ringer during call incoming, call-incoming-pattern controlling means for controlling a ringing pattern of said ringer during call incoming, vibrator controlling means for controlling a vibrator for signaling call incoming, and answering-phone-function controlling means for controlling an answering phone function;

call-incoming-operation limiting function controlling means for instructing said controlling means at the time set by a user to effect a changeover of operation during call incoming;

call-incoming-operation change information setting means for holding a plurality of individual time settings that have been individually set by the user, and for setting an average of the plurality of individual time settings as the time set by the user.

14. A telephone with a call-incoming-operation limiting function according to any of the claims 1 to 8 or 13, further comprising:

signaling means for signaling to the user that the time measured by said clock means and the time set by the user have coincided.

15. A telephone with a call-incoming-operation limiting function according to any one of the claims 9–12, further comprising the step of:

automatically signaling to the user each time said time zone arrives.

* * * * *

UNITED STATES PATENT AND TRADEMARK OFFICE
CERTIFICATE OF CORRECTION

PATENT NO. : 6,763,105 B1
DATED : July 13, 2004
INVENTOR(S) : Nozomi Miura et al.

It is certified that error appears in the above-identified patent and that said Letters Patent is hereby corrected as shown below:

Title page,
Item [56], References Cited, FOREIGN PATENT DOCUMENTS, please insert therefor:

-- JP       2-184159       7/1990
   JP       9-172472       6/1997
   DE       196 45 751 A1  7/1997 --

Signed and Sealed this

Twenty-eighth Day of September, 2004

JON W. DUDAS
*Director of the United States Patent and Trademark Office*